United States Patent [19]

Koishi et al.

[11] Patent Number: 5,795,654
[45] Date of Patent: Aug. 18, 1998

[54] ADHESIVE FOR BONDING TOGETHER POLYVINYLIDENE FLUORIDE RESIN AND SUBSTRATE

[75] Inventors: Toshio Koishi, Sakado; Katsunori Kawamura, Kawagoe; Seiiti Minegishi, Moroyama, all of Japan

[73] Assignee: Central Glass Company, Ltd., Ube, Japan

[21] Appl. No.: 760,080

[22] Filed: Dec. 4, 1996

[30] Foreign Application Priority Data

Dec. 4, 1995 [JP] Japan ................. 7-315424

[51] Int. Cl.⁶ ............................................. C09J 127/16
[52] U.S. Cl. .................. 428/421; 524/104; 524/210; 525/66; 525/72; 525/124; 525/125; 525/199
[58] Field of Search ....................... 525/125, 199, 525/124, 66, 72; 428/421; 524/104, 210

[56] References Cited

U.S. PATENT DOCUMENTS 4,472,557  9/1984  Kawashima et al. .
5,242,976  9/1993  Strassel ......................... 525/199
5,569,524  10/1996  Akatsu ......................... 525/199

FOREIGN PATENT DOCUMENTS 6422547  1/1989  Japan .
8012957  1/1996  Japan .

*Primary Examiner*—Patricia A. Short
*Attorney, Agent, or Firm*—Evenson, McKeown, Edwards & Lenahan, P.L.L.C.

[57] ABSTRACT

The invention provides an adhesive for bonding together a first substrate made of a polyvinylidene fluoride resin and a second substrate. This adhesive includes an elastic fluorohydrocarbon resin, an acrylic resin, a polyvinylidene fluoride resin, a polyisocyanate, and an organic solvent. This elastic fluorohydrocarbon resin is obtained by graft copolymerization of a fluorine-containing copolymer with a vinylidene fluoride monomer. This copolymer is prepared by copolymerizing at least one first fluorine-containing monomer with at least one unsaturated monomer that has peroxy bond. The adhesive itself is superior in durability, and bond strength between the first and second substrates is also superior.

24 Claims, No Drawings

ADHESIVE FOR BONDING TOGETHER POLYVINYLIDENE FLUORIDE RESIN AND SUBSTRATE

BACKGROUND OF THE INVENTION

The present invention relates to an adhesive for bonding together a first substrate made of a polyvinylidene fluoride resin and a second substrate and thus for preparing a laminate which is in the form of, for example, film, sheet or composite cloth.

Polyvinylidene fluoride (VDF) resin, which is a general term referring to polyvinylidene fluoride (PVDF) or to VDF copolymer, is widely known as being resistant against corrosive chemicals and ultraviolet rays and as being superior in mechanical characteristics. Of fluororesins, PVDF resin is particularly superior in extrudability and meltability for use as a powder coating or the like. Therefore, PVDF resin is widely used as an anticorrosion coating for metal and as an electric wire coating. Furthermore, VDF has a superior characteristic as a barrier against gases, as compared with other fluororesins.

PVDF resin film is widely used as a coating on a substrate, for providing the substrate with chemical resistance, stain resistance and the like. For example, there is provided a commercial PVDF resin product for an awning of truck and the like. In this product, a PVDF film having a thickness of about 5 μm is stuck to a soft polyvinyl chloride sheet by an acrylic adhesive.

U.S. Pat. No. 4,472,557 discloses an elastic fluorohydrocarbon resin obtained by graft copolymerization of a fluorine-containing elastomeric polymer with a fluorine-containing crystalline polymer (e.g., PVDF). Japanese Patent Unexamined Publication JP-A-Sho-64-22547 discloses an elastic fluorohydrocarbon resin film stuck to a substrate by a polyurethane resin layer (adhesive). This elastic fluorohydrocarbon resin film is obtained by graft copolymerization of a fluorine-containing elastomeric polymer with PVDF.

However, conventional adhesives for bonding together PVDF resin and another material are inferior to the PVDF resin itself in weathering resistance, water resistance, heat resistance, and the like. Therefore, these adhesives may be deteriorated under a condition of outdoor use for a long period of time or under a condition of severe temperature and severe humidity. With this, for example, the PVDF resin may peel off the adhesive.

JP-A-8-012957 discloses an adhesive in which an elastic fluorohydrocarbon resin and a polyisocyanate are dissolved in an organic solvent. This adhesive itself is superior in durability, and its bond strength for bonding together a first substrate made of a PVDF resin and a second substrate is high.

SUMMARY OF THE INVENTION

It is therefore an object of the present invention to provide an adhesive for bonding together a first substrate made of a PVDF resin and a second substrate, which adhesive is superior in bond strength, as compared with that of JP-A-7-012957.

According to the present invention, there is provided an adhesive for bonding together a first substrate made of a material containing a first polyvinylidene fluoride resin and a second substrate. This adhesive comprises an elastic fluorohydrocarbon resin, an acrylic resin, a second polyvinylidene fluoride resin, a polyisocyanate, and an organic solvent.

In fact, the inventors have prepared an adhesive according to the present invention by adding an acrylic resin and a PVDF resin that are compatible with an elastic fluorohydrocarbon resin, to the adhesive of JP-A-8-012957, and have unexpectedly found that the adhesive is much improved in bond strength, as compared with that of JP-A-8-012957.

In fact, an adhesive according to the present invention is superior in durability and very effective for bonding together a first substrate made of a polyvinylidene fluoride resin and a second substrate having thereon active hydrogen atom. Therefore, a laminate having a superior bond strength is formed by using the adhesive, and this laminate may effectively be used outdoors for a long period of time.

DESCRIPTION OF THE PREFERRED EMBODIMENTS

In the following, an adhesive according to the present invention for bonding together a first substrate made of a first polyvinylidene fluoride (VDF) resin and a second substrate will be described. By using this adhesive, the first substrate is stuck to the second substrate to improve the surface characteristics of the second substrate and to prepare a laminate. In this laminate, the first substrate as a protective layer is formed on the second substrate with an interposal of the adhesive therebetween. The adhesive comprises an elastic fluorohydrocarbon resin, an acrylic resin, a second polyvinylidene fluoride resin, a polyisocyanate, and an organic solvent.

In the invention, the second polyvinylidene fluoride resin, which is used in the adhesive, may be a homopolymer of VDF or a copolymer of VDF and at least one other fluorine-containing monomer. In the second polyvinylidene fluoride resin, the molar ratio of a structural unit derived from VDF to another structural unit derived from the at least one other fluorine-containing monomer is in a range of from 90:10 to 100:0. The at least one other fluorine-containing monomer is not particularly limited, and its examples are tetrafluoroethylene (TFE), hexafluoropropylene (HFP), chlorotrifluoroethylene (CTFE), and hexafluoro acetone (HFA). It is preferable to use the second polyvinylidene fluoride resin in an amount of from 2 to 50 parts by weight per 100 parts by weight of the elastic fluorohydrocarbon resin. If it is less than 2 parts by weight, bond strength of the adhesive may not be much improved. If it is greater than 50 parts by weight, the laminate may become inferior in flexibility.

In the invention, an elastic fluorohydrocarbon resin disclosed in U.S. Pat. No. 4,472,557 may be used for preparing the adhesive. An elastic fluorohydrocarbon resin of the invention is preferably obtained by graft copolymerization of a fluorine-containing copolymer with a VDF monomer. This copolymer has a glass transition temperature below room temperature. Thus, the fluorine-containing copolymer's segment in the resin provides the adhesive with a necessary softness, a sufficient solubility for dissolution in the organic solvent, and a sufficient bond strength to be stuck to the second substrate. On the other hand, the PVDF segment which is formed in the resin by the graft copolymerization provides the adhesive with a sufficient heat fusibility with the PVDF resin of the first substrate.

It is preferable that the elastic fluorohydrocarbon resin is prepared by a method comprising the steps of:

(a) copolymerizing at least one first fluorine-containing monomer with at least one second monomer having (i) at least one double bond and (ii) at least one peroxy bond, thereby to produce the fluorine-containing copolymer having a peroxy bond capable of decomposition during graft copolymerization;

(b) providing a dispersion of said fluorine-containing copolymer in a liquid medium;

(c) introducing into said dispersion a third vinylidene-fluoride monomer; and (d) polymerizing said third monomer in said dispersion so as to cause decomposition of said peroxy bond, thereby causing at least a portion of said third monomer to undergo graft copolymerization with said copolymer.

Examples of the at least one second monomer having (i) at least one double bond and (ii) at least one peroxy bond are unsaturated peroxy esters such as t-butyl peroxymethacrylate and t-butyl peroxycrotonate, and unsaturated peroxycarbonates such as t-butyl peroxyallylcarbonate and p-menthane peroxyallylcarbonate.

The fluorine-containing copolymer is not particularly limited in composition. Examples of the fluorine-containing copolymer are copolymers of VDF and HFP, ternary copolymers of VDF, HFP and TFE, and copolymers of VDF and CTFE, where every copolymer has a structural unit derived from the at least one second monomer. Of these, it is particularly preferable to use a fluorine-containing copolymer of VDF, CTFE and the at least one second monomer. In this copolymer, the molar ratio of a structural unit derived from VDF to another structural unit derived from CTFE is in a range of from 40:60 to 80:20. Furthermore, this copolymer is prepared by using the at least one second monomer in an amount of from 0.01 to 5 parts by is weight per 100 parts by weight of the total weight of VDF and CTFE.

It is preferable that the weight ratio of the fluorine-containing copolymer to PVDF which is graft copolymerized with this copolymer is within a range from 30:70 to 95:5. If this ratio is greater than 95:5, the adhesive may become insufficient in bond strength with the PVDF resin, after the PVDF resin has been stuck to the adhesive by adding heat. If this ratio is less than 30:70, the adhesive may become insufficient in softness and in solubility for dissolution in the organic solvent.

In the invention, examples of the acrylic resin to be mixed with the elastic fluorohydrocarbon resin are a first homopolymer made by polymerizing an alkyl ester of acrylic acid, a second homopolymer made by polymerizing an alkyl ester of mathacrylic acid, a first copolymer made by polymerizing an alkyl acrylate and at least one other monomer, a second copolymer made by polymerizing an alkyl methacrylate and at least one other monomer, and mixtures of at least two of these. Each of the above alkyl ester of acrylic acid and that of methacrylic acid has an alkyl group having a carbon atom number of from 1 to 18. Examples of these alkyl esters are methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, hexyl acrylate, hexyl methacrylate, 2-ethylhexyl acrylate, 2-ethylhexyl methacrylate, lauryl acrylate, lauryl methacrylate, and stearyl acrylate. The suitable acrylic resin is made, for example, by polymerizing at least 60 wt % (preferably at least 70 wt %), based on the total weight of all monomers, of methyl methacrylate, an alkyl ester of methacrylic acid having an alkyl group that is from 2 to 4 in carbon atom number, an alkyl ester of acrylic acid having an alkyl group that is from 1 to 8 in carbon atom number, styrene, acrylonitrile, and the like. A particularly preferable example of the second copolymer is made by polymerizing methyl methacrylate used as a major monomer, for example, in an amount of at least 60 wt %, and 5–20 wt % of a monomer that is one selected from butyl acrylate, butyl methacrylate, isobutyl acrylate, and isobutyl methacrylate.

In the invention, it is necessary that the acrylic resin to be mixed with the elastic fluorohydrocarbon resin is compatible with the elastic fluorohydrocarbon resin. The adhesive is much improved in bond strength by the addition of such acrylic resin. The actual mechanism of this improvement has not yet been clarified. When the adhesive of the present invention is modified by replacing an acrylic resin that is compatible with the elastic fluorohydrocarbon resin with another acrylic resin that is not compatible with the same, the modified adhesive resin that is not according to the present invention becomes inferior in bond strength. Therefore, it is assumed that the acrylic resin of the invention has an advantageous effect on the substrates to increase bond strength. The acrylic resin is in an amount preferably of from 2 to 50 parts by weight, more preferably of from 5 to 30 parts by weight, per 100 parts by weight of the elastic fluorohydrocarbon. If it is less than 2 parts by weight, bond strength of the adhesive may not improve so much. If it is greater than 50 parts by weight, the adhesive may become inferior in bond strength, weather resistance, water resistance, heat resistance, and the like.

In the invention, the acrylic resin is such that a dry film having a thickness of about 50 μm is preferably not greater than 30, more preferably not greater than 20, in a haze value that is defined in Japanese Industrial Standard K6714. This dry film is prepared by a method comprising steps of (a) dissolving the acrylic resin and the elastic fluorohydrocarbon resin into a solvent to prepare a mixture; (b) applying the mixture to a substrate to form thereon a wet film; (c) drying the wet film into the dry film; and (d) separating the dry film from the substrate to determine the haze value. It is understood that "haze value" as used in the claims refers to the haze value as defined in JIS K6714.

In the invention, the polyisocyanate is not particularly limited, and thus it can be selected from various polyisocyanates. It is considered that the mixing of the polyisocyanate with the elastic fluorohydrocarbon resin serves to increase the bond strength between the adhesive and the second substrate, and that the polyisocyanate reacts mainly with terminal groups of the elastic fluorohydrocarbon resin, thereby to improve the adhesive in creep resistance, heat resistance and the like.

In the invention, it is necessary that the polyisocyanate to be mixed with the elastic fluorohydrocarbon resin is compatible with the elastic fluorohydrocarbon resin. The polyisocyanate is such that a dry film having a thickness of about 50 μm is preferably not greater than 30, more preferably not greater than 20, in a haze value that is defined in Japanese Industrial Standard K6714. This dry film is prepared by a method comprising steps of (a) dissolving the polyisocyanate, the acrylic resin, and the elastic fluorohydrocarbon resin into a solvent to prepare a mixture; (b) applying the mixture to a substrate to form thereon a wet film; (c) drying the wet film into the dry film; and (d) separating the dry film from the substrate to determine the haze value.

The mixing ratio of the polyisocyanate to the elastic fluorohydrocarbon resin is preferably within a range from 0.3:100 to 50:100 by weight and more preferably within a range from 0.5:100 to 30:100 by weight. If the amount of the polyisocyanate is less than 0.3 parts by weight, the effect of the polyisocyanate addition may be insufficient. If the amount of the polyisocyanate is greater than 50 parts by weight, the adhesive may become insufficient in softness, chemical resistance and weathering resistance.

Nonlimitative examples of the polyisocyanate are ethylene diisocyanate, tetramethylene diisocyanate, hexamethylene diisocyanate (HDI), dodecamethylene diisocyanate, 1,6,11-undecane triisocyanate, 2,2,4-trimethylhexane diisocyanate, 2,6-diisocyanate methylcaproate (LDI), bis(2-isocyanate ethyl) fumarate, bis(2-isocyanate ethyl) carbonate, 2-isocyanate ethyl-2,6-diisocyanate hexanoate, isophorone diisocyanate (IPDI), 4,4'-diphenylmethane diisocyanate (MDI), dicyclohexylmethane diisocyanate (hydrogenated MDI or HMDI), cyclohexylene diisocyanate, methylcyclohexylene diisocyanate (hydrogenated TDI), bis (2-isocyanate ethyl) -4-cyclohexene- 1,2-dicarboxylate, xylylene diisocyanate (XDI), diethylbenzene diisocyanate, tolylene diisocyanate (TDI). Further examples of the polyisocyanate are urethane adducts, biuret compounds, isocyanurates, blocked isocyanates and urethane prepolymers, which are prepared by using the above examples of the polyisocyanate, such as water-modified HDI, TDI dimer, TDI-trimethylol-propane (TMP) adduct (L), HMDI-biuret compound, blocked L-phenol compound, IPDI trimer, and mixtures of at least two of these examples.

With respect to the selection of the polyisocyanate, when the discoloration of the adhesive is unfavorable, polyisocyanates of which isocyanate group is not positioned adjacent to the benzene nucleus are preferably used. Examples of these polyisocyanates are aliphatic diisocyanates such as HDI, XDI and LDI, alicyclic isocyanates such as IPDI, hydrogenated MDI and hydrogenated XDI. Furthermore, urethane adducts, biuret compounds, isocyanurates, blocked isocyanates and urethane prepolymers, which are prepared by using these examples of the polyisocyanate, can also preferably be used.

In the invention, the PVDF resin of the first substrate comprises a polyvinylidene fluoride (PVDF) or a copolymer of VDF and at least one other monomer such as CTFE, TFE, HFP, trifluoroethylene, and HFA. Examples of this copolymer are a copolymer of VDF and CTFE, a copolymer of VDF and TFE, a copolymer of VDF and HFP, a copolymer of VDF and trifluoroolefin, a copolymer of VDF and HFA, and a copolymer of VDF, HFP and TFE. In this PVDF resin, a VDF structural unit preferably makes up at least 50% of the total of all structural is units of the PVDF resin. In the invention, the PVDF resin of the first substrate may be in the form of a block polymer, a graft polymer (e.g. an elastic fluorohydrocarbon resin), or a resin blend of these polymers.

In the invention, the second substrate having active hydrogen atom on the surface thereof, which is capable of reacting with isocyanate group is preferably used, because a particular pretreatment on the second substrate's surface is not necessary. Examples of functional groups containing the active hydrogen atom are —OH, —COOH, —NH$_2$, —CONH and ester groups. As polymers containing these functional groups, for example, acrylic resin, polyurethane resin, polyamide resin, and polyester resin can be cited. In the invention, the second substrate may be, for example, a substrate made of a resin which has active hydrogen atoms of a pendant functional group, a substrate made of a blended resin between a resin having active hydrogen atoms and another resin not having it, or a substrate coated with an active hydrogen atom containing material.

If the second substrate is made of metal, glass or the like, the second substrate is coated with a primer such as silane coupling agent. The silane coupling agent which can be used in the invention is an organosilicon compound represented by R$^1$—Si(OR$^2$)$_3$, where R$^1$ is a halogen or an organic functional group such as vinyl group or amino group, and OR$^2$ is a hydrolyzable group such as acyloxy group or alkoxyl group. Examples of such organosilicon compound are chloroalkyl group containing silanes such as γ-chloropropyl-methyldichlorosilane, γ-chloropropylmethyldimethoxysilane, γ-chloropropylmethyldiethoxysilane, γ-chloropropyltrimethoxysilane and γ-chloropropyltriethoxysilane; unsaturated group containing silanes such as vinyltrichlorosilane, vinyltriethoxysilane, vinyltris (methoxyethoxy)silane and γ-methacryloxypropyltrimethoxy-silane; γ-glycidoxy- and epoxy-containing silanes such as γ-glycidoxypropyltrimethoxysilane, g-glycidoxypropyltriethoxy-silane, γ-glycidoxypropylmethyldiethoxysilane, γ-glycidoxypropylmethoxysilane and g-glycidoxypropylsilane triol; mercapto-containing silanes such as γ-mercaptopropyltrimethoxysilane; and amino-containing silanes such as γ-aminopropyltrimethoxysilane, γ-aminopropyltriethoxysilane, γ-aminopropylmethyldiethoxysilane and N-(2-aminoethyl)-3-aminopropyltrimethoxysilane. Of these examples, the amino-containing silanes are the most preferable examples, because these silanes are easily obtainable on the market.

In case that a resin (e.g., polyethylene or polytetrafluoroethylene) to which an adhesive according to the present invention is hardly stuck is used for the second substrate, a certain treatment (e.g., flame treatment, corona discharge treatment, or sodium etching treatment) should be conducted. With this, a functional group(s) having active hydrogen atom is formed on the surface of this resin. Therefore, a strong bonding between the adhesive and the resin can be achieved. Thus, the second substrate is not limited in material as long as the second substrate is made of a material which can be formed into a fibrous or platelike shape. Therefore, the material for the second substrate can be selected from various materials, according to the requisite characteristics therefor in mechanical strength, heat resistance, weathering resistance, transparency and the like.

The first and second substrates are not particularly limited in shape. It is preferable that these substrates are platelike in shape. In particular, it is preferable that at least one of these substrates is platelike, sheet or film-like in shape. These substrates may or may not have hole(s) and/or pattern(s), and may or may not be formed into a woven fabric or nonwoven fabric.

The organic solvent of the adhesive can be selected from various organic solvents. In view of solubility of the elastic fluorohydrocarbon resin, it is preferable to select the organic solvent from high-polarity organic solvents such as N,N-dimethylformamide (DMF), N,N-dimethylacetoamide and N-methylpyrrolidone, and ketones and esters such as acetone, methyl ethyl ketone, methyl isobutyl ketone, ethyl acetate and tetrahydrofuran. As the organic solvent of the present invention, it is possible to use at least one solvent selected from the group consisting of high-polarity solvents and other solvents (e.g., ketones and esters). For example, as the organic solvent, it is possible to use a solvent mixture of at least one high-polarity solvent and at least one other solvent.

The mixing ratio of the organic solvent to the other components of the adhesive is decided according to the requisite viscosity in the application of the adhesive. In general, the amount of the organic solvent is adjusted such that the concentration of the total of the elastic fluorohydrocarbon, the polyisocyanate, the PVDF resin, and the acrylic resin is from 1 to 60 wt % based on the total weight of the adhesive solution.

In general, the laminate is prepared by a method comprising the sequential steps of: (a) coating the second substrate with the adhesive to form thereon an adhesive film; (b) vaporizing the organic solvent to dry the adhesive film; and (c) sticking the first substrate to the adhesive film by adding heat.

The coating method may be selected from usual methods such as dip coating, coating with brush, spray coating, roller coating, flow coating and curtain flow coating. The vaporization of the organic solvent may be conducted using heat or without using heat. The above-mentioned step (c) is conducted by adding heat under a certain pressure (preferably from about 5 to 100 kgf/cm$^2$ to get the flat surface) or without adding any pressure. The heating temperature during the step (c) is limited to a certain range by the degree of heat resistance of the second substrate. In case that the second substrate is made of a heat resistant material such as glass or glass fiber, it is preferable that the step (c) is conducted at a temperature not higher than 280° C. for maintaining the proper function of the adhesive. If this temperature is not higher than 180° C., the PVDF resin may not be melted in the step (c). With this, the PVDF resin may not be stuck to the adhesive film. The step (c) may be discontinuously conducted for preparing each piece of laminate or continuously conducted for preparing a roll of laminate.

The following nonlimitative examples are illustrative of the present invention.

EXAMPLE 1

In this example, an adhesive according to the present invention was prepared; then the first and second substrates were bonded together by the adhesive to prepare a laminate; and then evaluation tests were conducted on the laminate, as follows.

(A) PREPARATION OF ADHESIVE

At first, 100 parts by weight of an elastic fluorohydrocarbon (EFHC) resin, 10 parts by weight of an acrylic resin, 10 parts by weight of a PPVDF resin, and 680 parts by weight of N,N-dimethylformamide were introduced into a glass beaker, as shown in Table 1. The elastic fluorohydrocarbon resin is made by Central Glass Company Limited and is a graft copolymer having a trunk polymer that is made by polymerizing CTFE, VDF and peroxy group containing monomer, and a branch polymer of VDF. The acrylic resin is made by Rohm & Haas Co. and has a trade name of PARALOYD B-44 (abbreviated to "B-44" in Table 1). The PPVDF resin is made by AUSIMONT Co. and has a trade name of HYLAR 710. The above mixture was stirred for 1 hr to dissolve the resins, using T. K. HOMODISPER (trade name) which is a high-speed stirrer made by Tokushu Kika Kogyo Co. at a speed of 2,000 r.p.m.

The thus obtained solution was applied to a transparent glass plate with a bar coater, followed by drying at 100° C. for 30 min, thereby to obtain a first dry film having a thickness of about 50 µm. Transparency of the first dry film was evaluated by determining its haze value in accordance with Japanese Industrial Standard (JIS) K6714 using a haze meter made by Toyo Seiki Seisakusho Co. By this determination, the first dry film was found to have a haze value of 14.6. This means that the first dry film is good in transparency and thus that the above resins dissolved in the solvent are compatible with each other.

To the above solution, 16.0 parts by weight of a hardner, CORONATE HX (trade name) which is a polyisocyanate made by Nippon Polyurethane Industry Co., was added for preparing an adhesive solution, while stirring was conducted. This polyisocyanate, CORONATE HX, is a non-yellowing type polyisocyanate prepared from HDI as a raw material and an isocyanurate ring. The thus prepared adhesive solution was applied to a glass plate, followed by drying, in the same manner as above, thereby to obtain a second dry film having a thickness of about 50 µm. By the same determination as above, the haze value of the second dry film was found to be 15.2. This also means that the above resins dissolved in the solvent are compatible with each other.

TABLE 1

|  | Amount of EFHC Resin (parts by wt.) | Acrylic Resin and Its Amount (parts by wt.) | PVDF resin and Its Amount (parts by wt.) | Hardener and Its Amount (parts by wt.) |
| --- | --- | --- | --- | --- |
| Example 1 | 100 | B-44 (10) | HYLAR 710 (10) | CORONATE HX (16) |
| Example 2 | 100 | B-44 (20) | HYLAR 710 (10) | CORONATE HX (16) |
| Example 3 | 100 | B-60 (20) | HYLAR 710 (10) | CORONATE HX (16) |
| Example 4 | 100 | B-72 (20) | HYLAR 460 (10) | CORONATE HX (16) |
| Example 5 | 100 | B-82 (20) | HYLAR 710 (10) | CORONATE HX (16) |
| Example 6 | 100 | B-44 (20) | HYLAR 710 (10) | DISMODULE (30) |
| Example 7 | 100 | B-44 (10) | HYLAR 460 (10) | CORONATE HX (16) |
| Com. Ex. 1 | 100 | — | — | CORONATE HX (16) |
| Com. Ex. 2 | 100 | — | HYLAR 710 (10) | CORONATE HX (16) |
| Com. Ex. 3 | 100 | RF-040 (20) | HYLAR 710 (10) | CORONATE HX (16) |

(B) PREPARATION OF LAMINATE

At first, a square cloth that is made of polyethylene terephthalate and has widths of 30 cm was immersed into the above-prepared adhesive solution. After the cloth was drawn up from the adhesive solution, a rubber roller was rolled on the cloth under a condition that the roller was pressed against the cloth, thereby to remove an excessive amount of the adhesive solution from the cloth. Then, the cloth was dried in an oven at 130° C. for 2 min. The amount of the dried adhesive attached to the cloth was about 20 g per 1 $m^2$ of the cloth.

Separately, a mixture was prepared by mixing together 100 parts by weight of the above elastic fluorohydrocarbon resin, 10 parts by weight of a PVDF, 2 parts by weight of a white pigment, and small amounts of an antitack agent and a lubricant. This PVDF is made by AUSIMONT Co. and has a trade name of HYLAR 710. This mixture was calendered into a film having a thickness of about 200 µm.

Then, the above-prepared cloth was interposed between the above-prepared films to prepare a laminate. Then, this laminate was interposed between stainless steel plates and then maintained under a pressure of 10 $kgf/cm^2$ in a compression molding machine heated at 200° C. Then, the laminate was taken from the machine and then was allowed to cool down for conducting the following evaluation tests.

(C) EVALUATION TESTS

The tensile peeling test was conducted on the laminate in accordance with JIS K 6328 using a rubber-coated cloth. The result is shown in Table 2.

The accelerated weathering test was conducted by putting the laminate for 2,000 hr in a sunshine weathermeter where the laminate was irradiated with light under the black panel condition and spraying was intermittently conducted for 12 minutes per 60 minutes on the laminate at a temperature of 63° C. After this weathering test, the external appearance of the laminate was observed with the naked eye. By this observation, there was found no abnormality in each of Examples 1–7 and Comparative Examples 1–3. After the weathering test, the above-mentioned tensile peeling test was conducted. The result is also shown in Table 2.

TABLE 2

| | Haze Value | | Peeling Strength (kgf/3 cm) | |
|---|---|---|---|---|
| | | | Before Weathering | After Weathering |
| | First Film | Second Film | Test | Test |
| Example 1 | 14.6 | 15.2 | 12.5 | 12.5 |
| Example 2 | 15.2 | 15.5 | 13.3 | 13.0 |
| Example 3 | 15.9 | 16.3 | 10.1 | 10.4 |
| Example 4 | 16.1 | 17.0 | 10.0 | 10.1 |
| Example 5 | 17.4 | 18.2 | 11.0 | 10.5 |
| Example 6 | 15.2 | 15.5 | 11.7 | 12.0 |
| Example 7 | 15.3 | 16.3 | 11.5 | 11.3 |
| Com. Ex. 1 | — | — | 6.3 | 6.3 |
| Com. Ex. 2 | 14.0 | 14.5 | 7.2 | 7.0 |
| Com. Ex. 3 | 36.8 | 38.1 | 5.5 | 4.6 |

EXAMPLE 2

In this example, Example 1 was repeated except in that the amount of the acrylic resin was modified into 20 parts by weight.

EXAMPLE 3

In this example, Example 1 was repeated except in that there was used, as the acrylic resin, 20 parts by weight of PARALOYD B-60 (trade name) that is a copolymer of methyl methacrylate and butyl methacrylate and made by Rohm & Haas Co. This is abbreviated to "B-60" in Table 1.

EXAMPLE 4

In this example, Example 1 was repeated except in that there was used, as the acrylic resin, 20 parts by weight of PARALOYD B-72 (trade name) that is a copolymer of ethyl methacrylate and made by Rohm & Haas Co., and that there was used, as the PVDF resin, 10 parts by weight of HYLAR 460 (trade name) is a copolymer of VDF that is made by AUSIMONT Co. In Table 1, PARALOYD B-72 is abbreviated to "B-72".

EXAMPLE 5

In this example, Example 1 was repeated except in that there was used, as the acrylic resin, 20 parts by weight of PARALOYD B-82 (trade names) that is a copolymer of methyl methacrylate and made by Rohm & Haas Co. In Table 1, PARALOYD B-82 is abbreviated to "B-82".

EXAMPLE 6

In this example, Example 1 was repeated except in that the amount of the acrylic resin was modified into 20 parts by weight and that there was used as the hardner 30 parts by weight of DISMODULE Z-4370 (trade name) that is an IPDI-based isocyanurate and made by Sumitomo Bayer Urethane Co.

EXAMPLE 7

In this example, Example 1 was repeated except in that there was used as the PVDF resin 10 parts by weight of HYLAR 460.

COMPARATIVE EXAMPLE 1

In this comparative example, Example 1 was repeated except in that the acrylic resin and the PVDF resin were omitted and that the haze value determination of the first and second films was omitted.

COMPARATIVE EXAMPLE 2

In this comparative example, Example 1 was repeated except in that the acrylic resin was omitted.

COMPARATIVE EXAMPLE 3

In this comparative example, Example 1 was repeated except in that the acrylic resin, PARALOYD B-44, was replaced by 20 parts by weight of ACRYPET RF-040 (trade name) that is an acrylic rubber made by Mitsubishi Rayon Co.

EXAMPLE 8

In this example, a laminate was prepared by bonding together the first and second substrates, using an adhesive of Example 1, as follows.

At first, one major surface of a taffeta cloth which has widths of 30 cm and a thickness of 0.3 mm and is made of nylon-6 fibers having a thickness of 720 deniers was coated with the adhesive by a bar coater. Then, the coated cloth was dried in an oven at 130° C. for 2 min. The amount of the dried adhesive formed on the taffeta cloth was about 15 g per 1 $m^2$ of the cloth.

Separately, HYLAR461 (trade name) that is a PVDF made of AUSIMONT Co. and the elastic fluorohydrocarbon resin of Example 1 were mixed together in a ratio of 1:2 by weight. This mixture was kneaded by two rolls which were kept heated at 180° C., and then were press-shaped at a constant rate into a 100 µm thick film (i.e., a PVDF resin film).

Then, the PVDF resin film was placed on the coated cloth to prepare a laminate in a manner to interpose the adhesive therebetween. Then, this laminate was interposed between 1 mm thick stainless steel plates and then maintained under a pressure of 10 kgf/cm² in a compression molding machine heated at 200° C. Then, the laminate was taken from the machine and then was allowed to cool down.

The thus prepared laminate was subjected to the same evaluation tests as those of Example 1. According to the tests, it was found that the laminate had peeling strengths of 11.8 and 11.5 kgf/3 cm before and after the weathering test, respectively.

EXAMPLE 9

In this example, a laminate was prepared by bonding together the first and second substrates, using an adhesive of Example 1, as follows.

At first, a glass plate having widths of 20 cm and a thickness of 3 mm was immersed into an aqueous solution containing 5% of a silane coupling agent which is an aminosilane, that is, SH6020 (trade name) made by Toray-Dow Corning-Silicone Co. Then, the glass plate was dried at 120° C. for 2 min. Then, one major surface of this glass plate was coated with the adhesive of Example 1 by a bar coater, followed by drying in an oven at 130° C. for 2 min to vaporize the solvent. The amount of the dried adhesive formed on the glass plate was about 10 g per 1 m² of the glass plate. Then, a commercial PVDF film which has a thickness of 150 μm and is made by SOLVEY Co. was placed on the coated glass plate to prepare a laminate. Then, this laminate was interposed between two fluoro-rubber plates, then was maintained under a pressure of 5 kgf/cm² for 2 min in a press machine heated at 200° C., and then was allowed to cool down.

The thus prepared laminate was subjected to the same evaluation tests as those of Example 1. According to the tests, it was found that the laminate had peeling strengths of 16.7 and 16.5 kgf/3 cm before and after the weathering test, respectively.

What is claimed is:

1. An adhesive for bonding together a first substrate made of a material containing a first polyvinylidene fluoride resin and a second substrate, said adhesive comprising:
   an elastic fluorohydrocarbon resin;
   an acrylic resin;
   a second polyvinylidene fluoride resin;
   a polyisocyanate; and
   an organic solvent.

2. An adhesive according to claim 1, wherein said elastic fluorohydrocarbon resin is prepared by a method comprising the steps of:
   (a) copolymerizing at least one first fluorine-containing monomer with at least one second monomer having (i) at least one double bond and (ii) at least one peroxy bond, thereby to produce a fluorine-containing copolymer having a glass transition temperature below room temperature and a peroxy bond capable of decomposition during graft copolymerization;
   (b) providing a dispersion of said fluorine-containing copolymer in a liquid medium;
   (c) introducing into said dispersion a third vinylidene-fluoride monomer; and
   (d) polymerizing said third monomer in said dispersion so as to cause decomposition of said peroxy bond, thereby causing at least a portion of said third monomer to undergo graft copolymerization with said copolymer.

3. An adhesive according to claim 2, wherein said at least one second monomer is at least one selected from the group consisting of unsaturated peroxy esters and unsaturated peroxycarbonates.

4. An adhesive according to claim 2, wherein said at least one first fluorine-containing monomer is selected from the group consisting of a combination of vinylidene fluoride and hexafluoropropylene, a combination of vinylidene fluoride, hexafluoropropylene and tetrafluoroethylene, and a combination of vinylidene fluoride and chlorotrifluoroethylene.

5. An adhesive according to claim 2, wherein said at least one first fluorine-containing monomer is a combination of vinylidene fluoride and chlorotrifluoroethylene, said fluorine-containing copolymer has a molar ratio of a first structural unit derived from said vinylidene fluoride to a second structural unit derived from said chlorotrifluoroethylene of from 40:60 to 80:20, and said at least one second monomer is in an amount of from 0.01 to 5 parts by weight per 100 parts by weight of a total of said vinylidene fluoride and said chlorotrifluoroethylene.

6. An adhesive according to claim 2, wherein the ratio of said fluorine-containing copolymer to said third monomer is within a range from 30:70 to 95:5 by weight.

7. An adhesive according to claim 1, wherein said acrylic resin is compatible with said elastic fluorohydrocarbon resin, and is in an amount of from 2 to 50 parts by weight per 100 parts by weight of said elastic fluorohydrocarbon.

8. An adhesive according to claim 7, wherein said acrylic resin is such that a dry film having a thickness of about 50 μm is not greater than 30 in a haze value said dry film being prepared by a method comprising the steps of (a) dissolving said acrylic resin and said elastic fluorohydrocarbon resin into a solvent to prepare a mixture; (b) applying said mixture to a substrate to form thereon a wet film; (c) drying said wet film into said dry film; and (d) separating said dry film from said substrate to determine said haze value of said dry film.

9. An adhesive according to claim 1, wherein said second polyvinylidene fluoride resin comprises one of a polyvinylidene fluoride and a copolymer of vinylidene fluoride and at least one other fluorine-containing monomer, and said second polyvinylidene fluoride resin has a molar ratio of a vinylidene fluoride structural unit to at least one other structural unit caused by said at least one other fluorine-containing monomer of from 90:10 to 100:0.

10. An adhesive according to claim 9 wherein said at least one other fluorine-containing monomer is at least one selected from the group consisting of tetrafluoroethylene, hexafluoropropylene, chlorotrifluoroethylene and hexafluoro acetone.

11. An adhesive according to claim 1, wherein said material of said first substrate contains at least 50 mol % of a vinylidene fluoride structural unit, and said second substrate has thereon active hydrogen atom.

12. An adhesive according to claim 1, wherein said polyisocyanate is at least one selected from a first group consisting of aliphatic diisocyanates and alicyclic isocyanates and from a second group consisting of urethane adducts, biuret compounds, isocyanurates, blocked isocyanates, and urethane prepolymers, each member of said second group being derived from one member of said first group.

13. An adhesive according to claim 12, wherein said first group consists of hexamethylene diisocyanate and isophorone diisocyanate, and said second group consists of said isocyanurates, said urethane adducts, and said biuret compounds.

14. An adhesive according to claim 1, wherein said second substrate is coated with a primer such that said second substrate has thereon active hydrogen atom.

15. An adhesive according to claim 14, wherein said primer comprises a silane coupling agent.

16. An adhesive according to claim 1, wherein said acrylic resin is one member selected from the group consisting of a first homopolymer made by polymerizing an alkyl ester of acrylic acid, a second homopolymer made by polymerizing an alkyl ester of mathacrylic acid, a first copolymer made by polymerizing an alkyl acrylate and at least one other monomer, a second copolymer made by polymerizing an alkyl methacrylate and at least one other monomer, and mixtures of at least two of these.

17. An adhesive according to claim 1, wherein said acrylic resin is a copolymer made by polymerizing, based on the total weight of all monomers for preparing said acrylic resin, at least 60 wt % of methyl methacrylate and 5–20 wt % of a monomer that is one selected from the group consisting of butyl acrylate, butyl methacrylate, isobutyl acrylate, and isobutyl methacrylate.

18. An adhesive according to claim 1, wherein said polyisocyanate is compatible with said elastic fluorohydrocarbon resin and is such that a dry film having a thickness of about 50 μm is not greater than 30 in a haze value, said dry film being prepared by a method comprising that steps of (a) dissolving said acrylic resin, said polyisocyanate, and said elastic fluorohydrocarbon resin into a solvent to prepare a mixture; (b) applying said mixture to a substrate to form thereon a wet film; (c) drying said wet film into said dry film; and (d) separating said dry film from said substrate to determine said haze value of said dry film.

19. An adhesive according to claim 1, wherein said polyisocyanate is in an amount of from 0.3 to 50 parts by weight per 100 parts by weight of said elastic fluorohydrocarbon resin.

20. An adhesive according to claim 1, wherein said organic solvent comprises N,N-dimethylformamide.

21. An adhesive according to claim 20, wherein said organic solvent is a solvent mixture of N,N-dimethylformamide and at least one other solvent selected from ketones and esters.

22. An adhesive according to claim 1, wherein said organic solvent comprises a first solvent which is at least one of N,N-dimethylacetoamide and N-methylpyrrolidone.

23. An adhesive according to claim 22, wherein said organic solvent is a solvent mixture of said first solvent and a second solvent which is at least one selected from the group consisting of ketones and esters.

24. A laminate comprising:

a first substrate made of a polyvinylidene fluoride resin; and a second substrate which is stuck to said first substrate by an adhesive of claim 1.

* * * * *